United States Patent [19]

Reynolds et al.

[11] Patent Number: 4,541,757
[45] Date of Patent: Sep. 17, 1985

[54] PROPELLANT MILLING TOOL, BUTTERFLY CUTTER

[75] Inventors: Keith B. Reynolds, Brigham City; Trevor R. Freston, Hyrum; Richard N. Ord; James T. Houghton, both of Brigham City, all of Utah

[73] Assignee: Morton Thiokol Inc., Chicago, Ill.

[21] Appl. No.: 512,307

[22] Filed: Jul. 11, 1983

[51] Int. Cl.$^4$ .................. B23C 5/02; B23C 5/10
[52] U.S. Cl. ............................ 407/53; 407/61; 407/42; 144/219
[58] Field of Search .............. 407/30, 34–49, 407/53, 54, 80, 103, 102, 61, 107, 7, 62; 408/199, 197, 240; 144/218, 219, 240, 241

[56] References Cited

U.S. PATENT DOCUMENTS

| 63,673 | 0/1867 | Tesseyman | 144/219 |
|---|---|---|---|
| 290,923 | 0/1883 | Pope | 144/219 |
| 2,406,780 | 9/1946 | Kutscha | 407/40 |
| 2,561,470 | 7/1951 | Hadley et al. | 407/50 |
| 2,618,992 | 11/1952 | Charles | 407/37 |
| 3,343,431 | 9/1967 | Boyer | 407/102 |
| 3,475,801 | 11/1969 | Tsunoda et al. | 408/199 |
| 3,540,315 | 11/1970 | Frietag | 407/54 |
| 3,597,104 | 8/1971 | Salcumbe | 407/103 |
| 4,265,282 | 5/1981 | Lenz | 407/54 |

FOREIGN PATENT DOCUMENTS 421001  2/1911  France ............................ 142/13

Primary Examiner—Leonidas Vlachos
Assistant Examiner—Jerry Kearns
Attorney, Agent, or Firm—Gerald K. White

[57] ABSTRACT

A cutting tool for milling solid propellant for rocket motors includes a cutting arm that is fixedly attached at a center location to a rotatable arbor or shaft. The cutting arm has a cutting blade and inwardly located hole at each end with each of the blades facing in cutting position substantially parallel to the axis of rotation of the arbor, the heels of the cutting surfaces being ground off to avoid or eliminate drag and resultant friction on the milling surface.

1 Claim, 5 Drawing Figures

PROPELLANT MILLING TOOL, BUTTERFLY CUTTER

The Government has rights to this invention pursuant to Contract F046H-81-C-0001 awarded by the U.S. Air Force.

BACKGROUND OF THE INVENTION

1. Field of the Invention

This invention relates to a cutting tool for milling solid propellants for rocket motors.

2. Description of the Prior Art

Cutters for milling solid propellants are known in the prior art. A problem with such cutters, particularly when used to machine plane surfaces on solid propellants or for removing propellant from rocket motors, is attendant friction and resultant high heat build-up. This not only has curbed the allowable rate of milling but has also required the use of cooling water to maintain the heat build-up at an acceptably low level and to carry away the chips.

Thus, there is a need and a demand for an improved milling cutter for solid propellants.

SUMMARY OF THE INVENTION

An object of the invention is to provide an improved cutting tool for milling solid propellants.

A more specific object of the invention is to provide a rotatable cutting tool for solid propellants having a hole disposed in operative association with the cutting blade thereof such that, as the surface of the propellant is being cut, the chips pass through the hole in the tool and are thrown away from the propellant surface by the centrifugal force of the rotating blade.

Another specific object of the invention is to provide such a cutting tool that is characterized, in addition to freedom from the accumulation of chips on the propellant surface, by a significant decrease in friction whereby low heat build-up is maintained, thus allowing dry machining at a greatly improved milling rate and enabling the elimination of the cooling water required for use with prior art milling tools.

In accomplishing these and other objectives of the invention, there is provided a propellant milling tool comprising an elongated rectangular cutting arm that is fixedly attached at a center location thereof to a rotatable arbor having a longitudinal axis. The cutting arm has a first end and a second end with the arbor being attached to the cutting arm between the first and second end. The dimension of the cutting arm transverse to the longitudinal axis of the arbor is substantially greater than the dimension thereof parallel to the longitudinal axis of the arbor. A cutting blade and an associated inwardly located hole provided at each of said first and second ends with the cutting edges of both blades being parallel to the longitudinal axis of the arbor. The cutting edges of both blades are sharpened to knife edges. One of the knife edges faces in one direction and the other knife edge faces in the opposite direction with respect to the cutting arm whereby, upon rotation of the arbor about the longitudinal axis thereof, the knife edges are in cutting position, adapted to be alternately swept across a propellant surface to be milled. For avoiding, or eliminating, drag and resultant friction on the propellant surface, the heels of the cutting surfaces may be ground off about 5°. Desirably, also, portions of the cutting arm adjacent the surface of the propellant being milled, for convenience termed bottom portions, may be ground off sufficiently to eliminate rubbing of the bottom portions of the cutting arm on the milled propellant surface.

BRIEF DESCRIPTION OF THE DRAWINGS

Having summarized the invention, a detailed description follows with reference being made to the accompanying drawings which form part of the specification, of which.

DESCRIPTION OF THE PREFERRED EMBODIMENT

Figure 5:
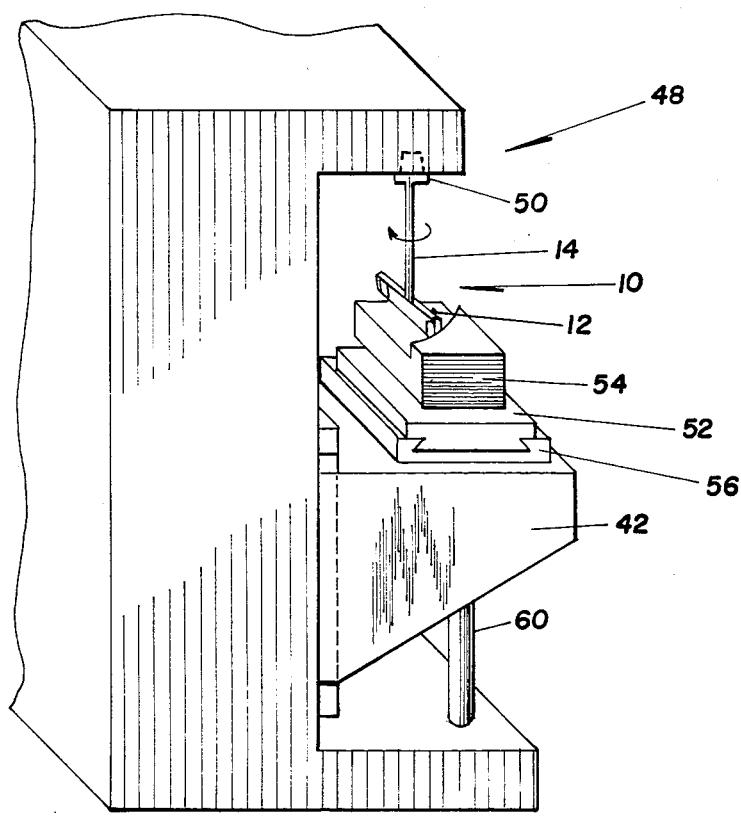
FIG. 5 illustrates the operation of the cutting tool of the invention in a vertical milling machine.

The invention is directed to a particularly formed butterfly cutter propellant milling tool. Referring to the plan view of FIG. 1, the tool indicated generally at 10 comprises an elongated rectangular cutting arm 12 made of tool steel that is fixedly attached at a central location thereof to one end of a suitable arbor 14. Specifically, as indicated by the dotted lines 16, a reduced diameter portion of the arbor 14, at one end thereof, extends through a hole 18 in the cutting arm 12. The arbor 14 may be welded to the arm 12 at the top surface 20 thereof and also at the bottom surface 22, chamfer and penetration welds 21 and 23 desirably being employed, as indicated. The other end of the arbor 14 may be held directly in the hole in a spindle nose of a vertical milling machine, as illustrated in FIG. 5, for effecting the rotation thereof, in a clockwise direction. As seen in FIG. 2, the diameter of the main portion of the arbor 14 and the thickness of the cutting arm 12 may desirably be substantially the same.

In the embodiment of the invention illustrated in the drawings, cutting arm 12 has six sides or surfaces, designated 20, 22, 24, 26, 28 and 30. Surfaces 20 and 22, for convenience, designated first and second surfaces, respectively, are oppositely facing and are substantially parallel. Similarly, surfaces 24 and 26 designated third and fourth surfaces, respectively, are also oppositely facing and parallel, as are also the fifth and sixth surfaces designated 28 and 30, respectively. As shown in the drawings, surfaces 20 and 22 are each positioned approximately perpendicular to each of surfaces 24 and 26, and surfaces 28 and 30 are each positioned approximately perpendicular to each of surfaces 20, 22, 24 and 26.

Figure 1:
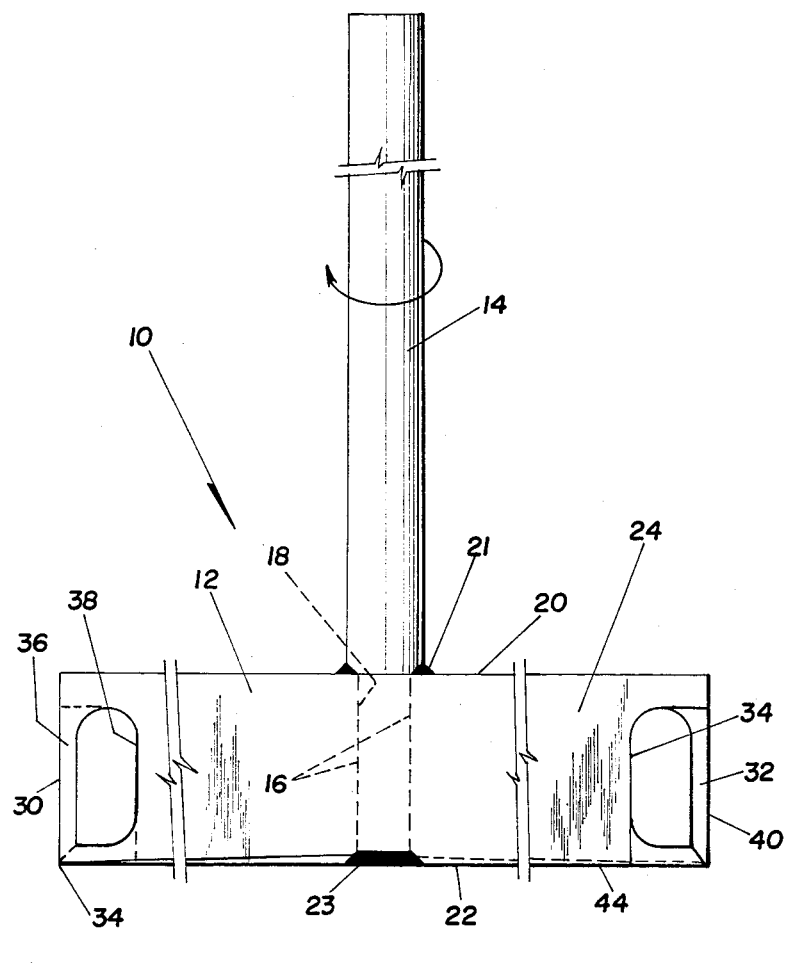
FIG. 1 is a fragmented plan view of the improved cutting tool according to the invention.
Figure 2:
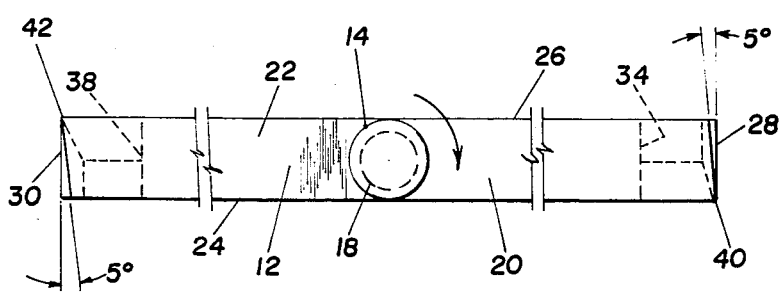
FIG. 2 is a top view of the cutting tool of FIG. 1.

At a first end of cutting arm 12, the right end as seen in FIG. 1, there is provided a straight cutting blade 32 and an associated inwardly located hole 34. A similar straight cutting blade 36 and associated inwardly located hole 38 are also provided at a second end of cutting arm 12, the left end. Each of the holes 34 and 38 is disposed in contiguous operative relation with its respectively associated cutting blade 32 and 36 such that as the surface of the propellant is being cut, the chips pass through the hole and are thrown away from the propellant surface by the centrifugal force of the cutting blade. The cutting edge 40 of cutting blade 32, as seen in FIG. 1, faces outwardly of the drawing, whereas the cutting edge 42 of cutting blade 36 faces inwardly thereof. As a result, upon rotation of arbor 14 in a clockwise direction, the cutting edges 40 and 42 are both disposed in cutting position.

Figure 3:
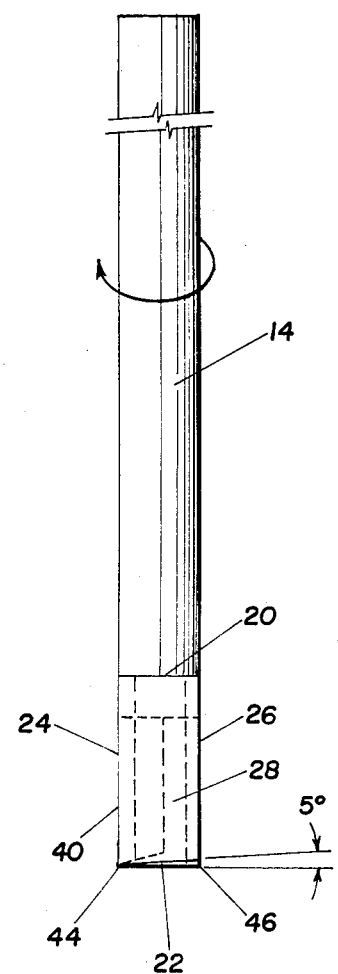
FIG. 3 is a view, partially broken away, of the tool of FIG. 1, as seen from the right side thereof in FIG. 1.

Cutting arm 12, which, as noted, is made of tool steel, desirably is hardened by tempering after machining to obtain hardened cutting edges for blades 32 and 36. The cutting edges 40 and 42 for the respective blades 32 and 36 are sharpened to knife edges. Additionally, the edge 44 of surfaces 22 and 24 of cutting arm 12 associated with the first end thereof, that is, to the right of the arbor 14, as seen in FIGS. 1 and 3, is also sharpened to a knife edge. Similarly, the edge 46 of surfaces 22 and 26 of cutting arm 12, associated with the left end thereof, that is, to the left of the arbor 14, is also sharpened to a knife edge.

Figure 4:
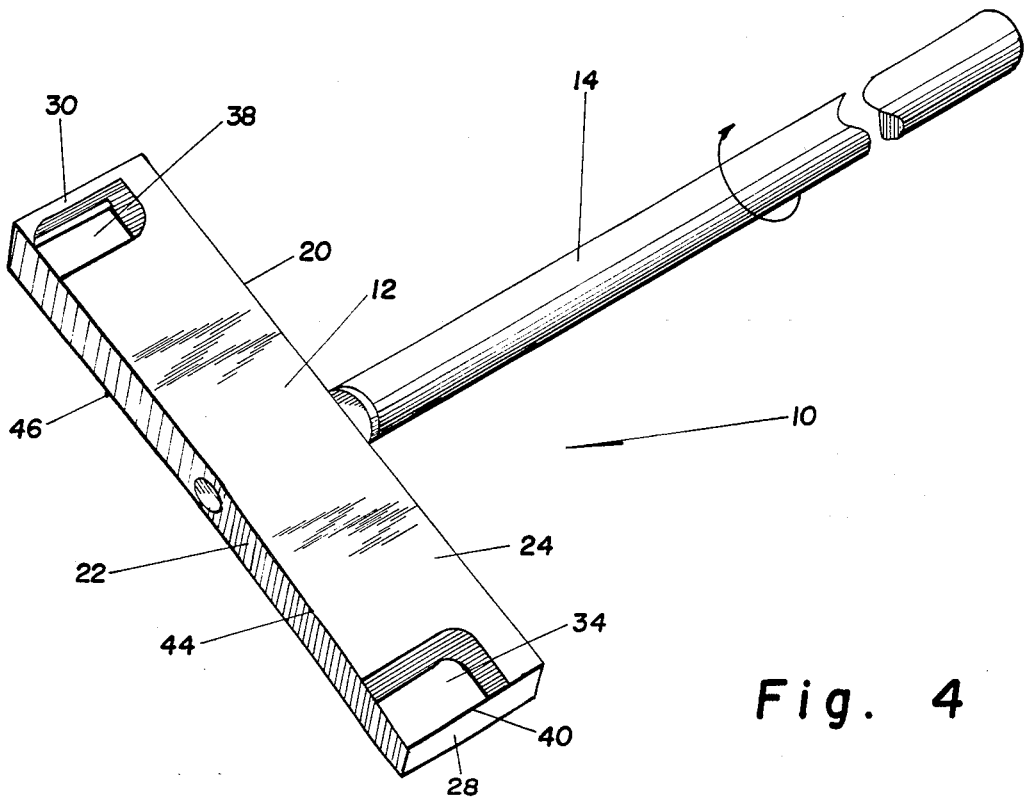
FIG. 4 is a prespective view of the cutting tool.

In order to eliminate drag and friction on the surface of the propellant being milled, the heels of the cutting surfaces of the cutting blades 32 and 36 are each ground off about 5° from the perpendicular as illustrated in FIG. 2, thus forming an angle of about 85° between the third and fifth surfaces 24 and 28, respectively, and between the fourth and sixth surfaces 26 and 30, respectively. Additionally, as best seen in FIGS. 3 and 4, the heel of the cutting surfaces associated with each of the knife edges 44 and 46 are ground off about 5° from the perpendicular. This forms an angle of about 85° between the second and third surfaces 22 and 24, respectively, and between the second and fourth surfaces 22 and 26, respectively.

Referring to FIG. 5, which illustrates the operation of the cutting tool of the invention in a vertical milling machine 48, the upper end of the arbor 14 is suitably supported (by means not shown) for rotation in a clockwise direction in a vertical spindle 50 which is power driven. Mounted on the table 52 of the milling machine, held by suitable means (not shown), and disposed for movement into milling relation with the cutting arm 12 of the tool 10 is a block 54 of propellant to be milled. As is customary in milling machines, the table 52 may be mounted on and slides on a saddle 56. The saddle 56, in turn, is supported on a knee 58 which is movable vertically, being supported by a knee elevating screw which may be disposed within a telescoping cover 60. The table 52, saddle 56 and knee 58 may be power or hand driven by screws (not shown) in fixed nuts.

In the operation of the tool 10, as the arbor 14 is rotated cockwise and the surface of the propellant 54 is being cut, the chips pass through the holes 34 and 38 of the cutting arm 12 and are thrown away from the propellant block 54 by the centrifugal force of the rotating cutting arm 12. This brings about several significant advantages over cutting tools used in the prior art for milling solid propellants. Thus, 1. Propellant chips do not accumulate on the propellant surface.
2. Friction is decreased; hence, the tool 10 does not heat during use.
3. Milling rates are greatly improved.

In an operative embodiment of the invention in which the overall length of the tool 10 including cutting arm 12 and arbor 14 is 9 in. (22.86 cm) and in which the dimension of the cutting arm are 5 in. (12/7 cm) long, 1.25 in. (3.175 cm) wide, and 0.5 in. (1.27 cm) thick, and the size of the holes 34 and 38 correspondingly proportioned, as seen in FIGS. 1-4, propellant has been milled at the following conditions; Rotational speed (0–1300 R.P.M.); Table speed (0–15 in./min.; 38.10 cm./min.); Cutting depth (0–0.5 in.; 1.27 cm.).

As those skilled in the art will understand, the same inventive concept may be used in larger tools for removing solid propellant from rocket motors. The outer cutting edges may be many inches long with ribs between the cutting edges and the main body of the cutting arm to maintain a rigid cutting edge. Low friction and low heat build-up allow dry milling and elimination of the cooling water that is used with the prior art cutting tools.

It will be understood, also, that while the knife edges 40, 42, 44 and 46 have been illustrated in the drawings to be in cutting position for rotation of the arbor 14 in the clockwise direction, the positions of the several knife edges may be reversed to be in cutting position upon rotation of the arbor 14 in the counterclockwise direction, if desired.

Thus, there has been provided, in accordance with the invention, an improved cutting tool for milling propellant for rocket motors. The improved tool is characterized in the provision of an inwardly located hole in association with each of the cutting edges of the rotatable cutting arm for preventing the accumulation of propellant chips on the propellant surface, and in the grinding off the heels of the surfaces of the cutting blades and the surfaces of the bottom of the cutting arm for eliminating drag and friction on the propellant surface, and thus avoiding heating of the tool during use whereby dry machining is allowed, the cooling water associated with the use of prior art tools not being required.

What is claimed is:

1. A cutting tool for milling solid propellant for rocket motors, said propellant having a surface, comprising:

an elongated rectangular cutting arm having a first end and a second end, and an arbor for holding said cutting arm, said arbor having a longitudinal axis and being rigidly attached at one end to said cutting arm at a central location thereon between said first and second ends with said cutting arm extending substantially perpendicularly thereto, the dimension of said cutting arm transverse to the longitudinal axis of said arbor being substantially greater than the dimension thereof parallel to the arbor longitudinal axis, said cutting arm having a straight cutting blade and an associated inwardly located hole at each of said first and second ends with said cutting blades facing in opposite directions in cutting positions that are substantially parallel to the longitudinal axis of said arbor as said arbor is rotated, and with each of said holes being disposed in contiguous operative relation with its associated cutting blade such that, as the surface of the propellant is being cut, the resulting chips pass through the hole and are thrown away from the propellant surface by the centrifugal force of the rotating blade, wherein said cutting arm further includes oppositely facing first and second surfaces, oopositely facing third and fourth surfaces, and oppositely facing fifth and sixth surfaces, with said first and second surfaces each positioned approximately perpendicular to each of said third and fourth surfaces, and with said fifth and sixth surfaces each positioned approximately perpendicular to each of said first, second, third and fourth surfaces, wherein said arbor is attached to said cutting arm in extending perpendicular relation to said first surface, wherein each of said cutting blades includes a knife edge with one knife edge coincident with an edge of each of said third and fifth surfaces and the other knife edge coincident with an edge of each of said fourth and sixth surfaces, wherein the angle between said third and fifth and the angle between said fourth and sixth surfaces are each about 85°, wherein a knife edge is formed at the junction of the portion of said second and third surfaces adjacent said first end of said cutting arm, wherein a knife edge is formed at the junction of the portions of said second and fourth surfaces adjacent said second end of said cutting arm, wherein the angle between said second and third surfaces at the knife edge formed thereat is about 85°, and wherein the angle between said second and fourth surfaces at the knife edge formed thereat is about 85°, whereby to avoid drag and friction of said cutting arm on the surface of the propellant being cut and thereby avoid heating of said cutting tool during use.

* * * * *